Figure 1:
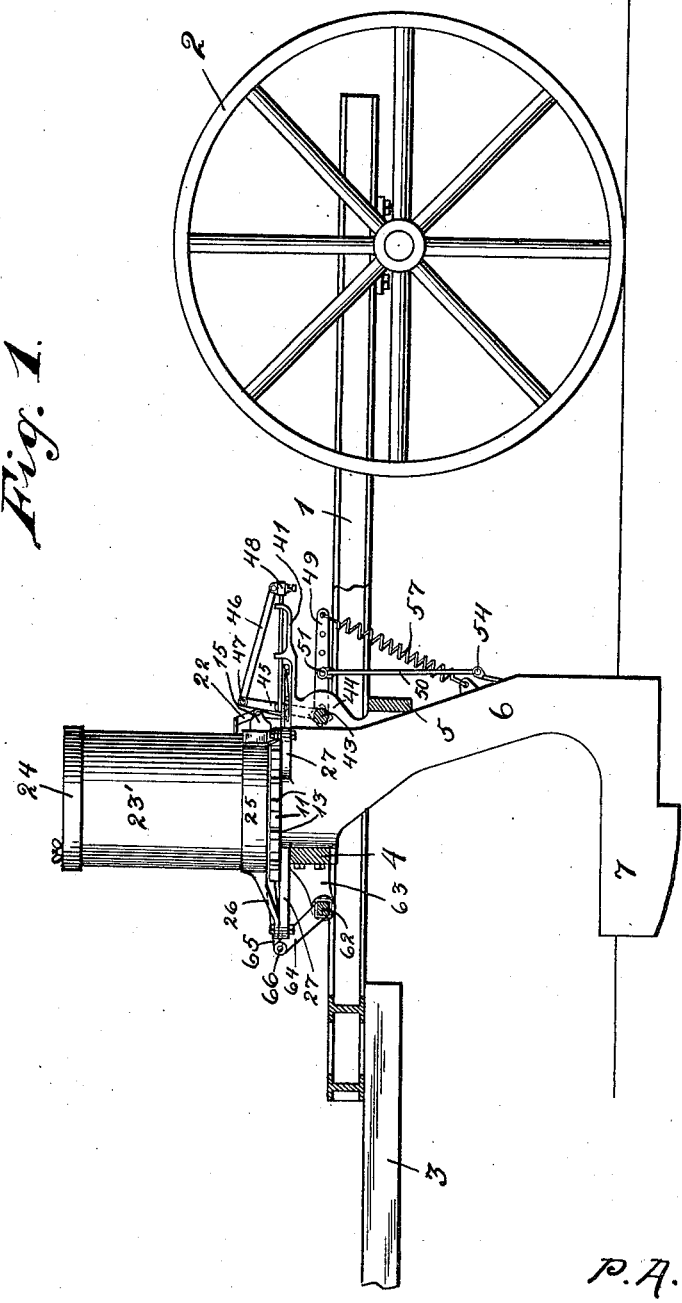

P. A. CUSTER.
SEED FEEDING DEVICE.
APPLICATION FILED DEC. 22, 1910.

1,004,749.

Patented Oct. 3, 1911.

3 SHEETS—SHEET 1.

Witnesses
J. Milton Jester
B. P. Washburne

Inventor
P. A. Custer.
By
C. L. Parker
Attorney

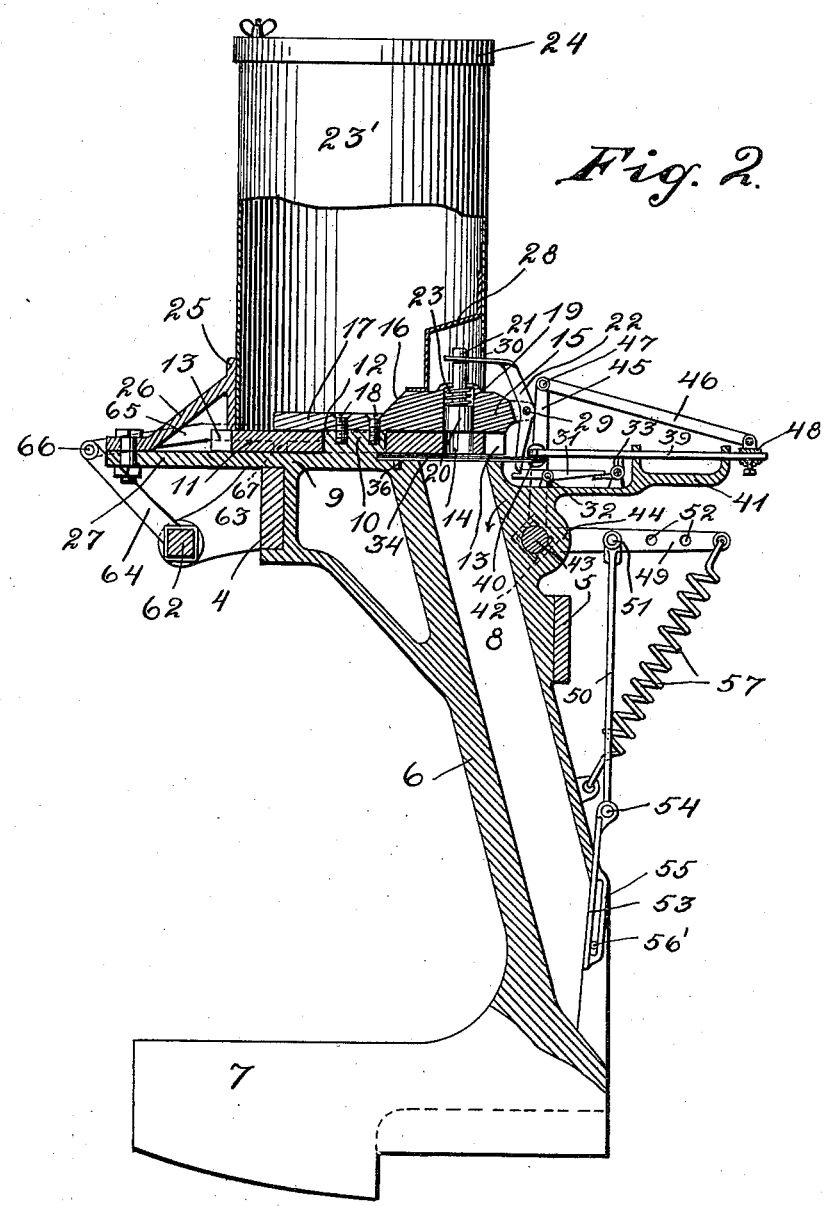

P. A. CUSTER.
SEED FEEDING DEVICE.
APPLICATION FILED DEC. 22, 1910.
1,004,749.
Patented Oct. 3, 1911.
3 SHEETS—SHEET 3.
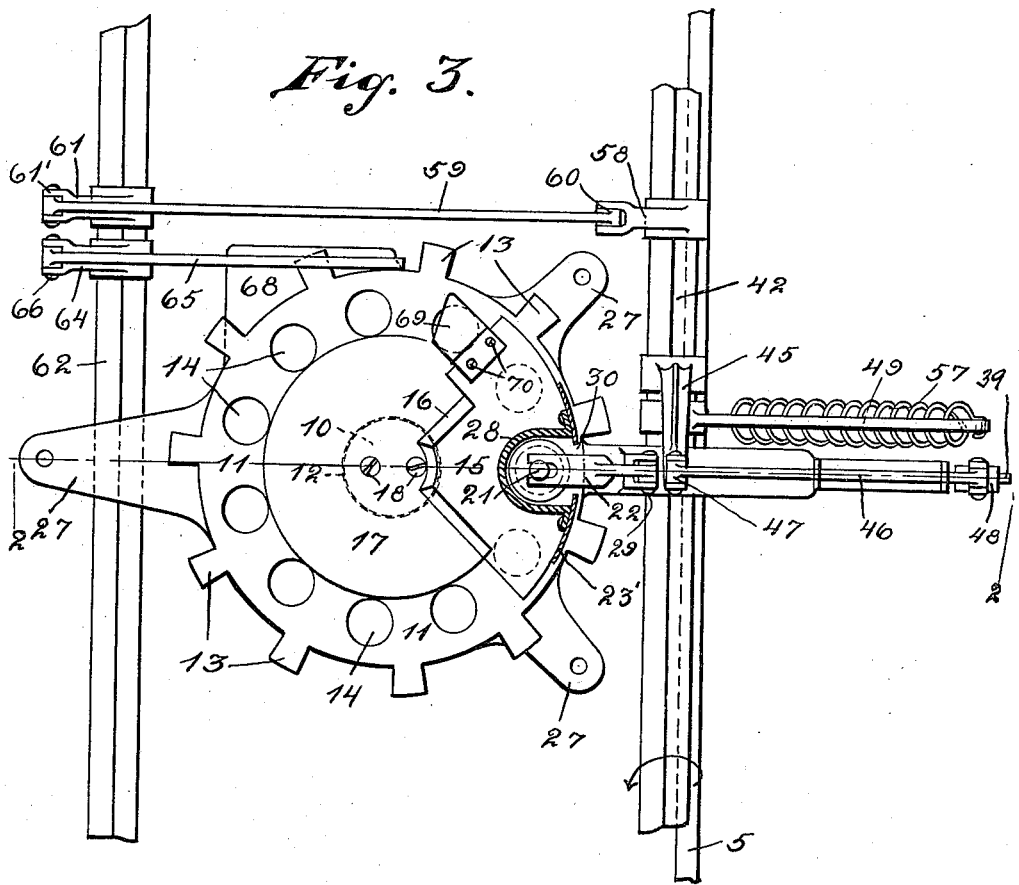
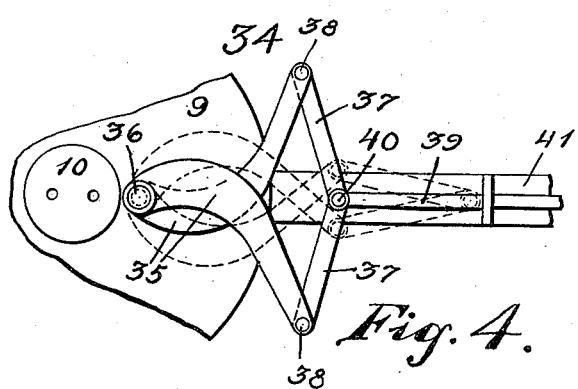
Witnesses
J. Milton Jester
B. W. Kirkbourne
Inventor
P. A. Custer
By
C. L. Parker
Attorney

UNITED STATES PATENT OFFICE.

PETER A. CUSTER, OF WOODRIVER, ILLINOIS.

SEED-FEEDING DEVICE.

1,004,749.  Specification of Letters Patent.  Patented Oct. 3, 1911.

Application filed December 22, 1910. Serial No. 598,758.

*To all whom it may concern:*

Be it known that I, PETER A. CUSTER, a citizen of the United States, residing at Woodriver, in the county of Madison and State of Illinois, have invented certain new and useful Improvements in Seed-Feeding Devices, of which the following is a specification.

My invention relates broadly to seed feeding mechanism to be used in connection with cotton planters or the like.

An important object of this invention is to provide seed feeding mechanism of the above character, whereby an exact required amount of grain may be planted at proper intervals.

A further object of this invention is to provide apparatus of the above character, which is automatic and positive in its operation.

Other objects and advantages of this invention will be apparent during the course of the following description.

In the accompanying drawings forming a part of this specification, and in which like numerals are employed to designate like parts throughout the same, Figure 1 is a side elevation of the seed feeding mechanism and a wheeled frame for supporting the same, Fig. 2 is a vertical sectional view taken through the seed feeding mechanism on line 2—2 of Fig. 3, Fig. 3 is a plan view of the same, the hopper being removed, and Fig. 4 is a bottom plan view of a toggle valve.

In the drawings wherein is illustrated a preferred embodiment of my invention, the numeral 1 designates a preferably rectangular frame, having its rear end suitably mounted upon wheels 2. To the forward end of the frame 1 is suitably mounted a tongue 3, as shown. Connected with the frame 1, above and below the same respectively, are transverse bars 4 and 5, to which is rigidly connected a feed-chute 6. The feed-chute 6 has its lower end provided with a furrow opening shoe 7. The feed-chute 6 has an opening 8 through which the grain passes to be planted in the soil, in a manner to be described. The upper end of the feed-chute 6 is provided with a horizontally disposed plate or casting 9, which carries near its center a cylindrical upstanding boss 10. A preferably circular disk 11 is rotatably mounted upon the plate 9, the same having an opening 12 formed centrally therethrough to receive the boss 10, as shown. This disk is provided upon its periphery with a plurality of equi-distantly spaced teeth 13. The disk 11 is provided inwardly of the teeth 13 and between the same, with equi-distantly spaced cylindrical openings 14, which correspond in number to the teeth 13, as clearly shown in Fig. 3. Disposed upon the circular disk 11, and having suitable engagement therewith, is a casting 15, which is beveled, as shown at 16, to form a thin approximately circular portion 17, as shown in Figs. 2 and 3. The casting 15 is rigidly connected with the boss 10, by means of screws 18 or the like. The casting 15 is provided with a vertically disposed cylindrical opening 19, adapted to successively register with the openings 14, when the disk 11 is rotated. Within the opening 19 is disposed a reciprocatory plunger 20, connected with a stem 21, which in turn has suitable pivotal connection with a bell-crank lever 22. This plunger, when released is urged downwardly by a compressible coil spring 23. Disposed above the disk 11 is a preferably cylindrical hopper 23', having its upper end closed by a cover 24. The lower end of the hopper 23' is formed open and suitably engages the disk 11, inwardly of the teeth 13. The hopper is held in place by a ring 25, having arms 26 formed thereon, which arms are connected with corresponding arms 27, by any suitable means, the last named arms having suitable connection with the plate 9. The stem 21 is covered by a sheet metal housing 28, which is suitably secured to the inner surface of the hopper 23'. A portion of the casting 15 extends outwardly of the hopper 23' and has pivotal connection with the bell-crank lever 22, as shown at 29. The upper arm of the bell-crank lever 22 operates in an opening 30 formed through the hopper 23'. The bell-crank lever 22 is held against movement by a latch or lever 31, such lever being pivoted intermediate its ends, as shown at 32. The lever 31 holds bellcrank lever 22 against movement when said lever 31 is in its horizontal position, as shown in Fig. 2. A trigger 33 is pivotally mounted near the rear end of the lever 31, to move said lever, whereby the bell-crank lever may be released.

The passage of material through the upper end of the opening 8 of the chute 6 is controlled by a toggle-valve 34, which is disposed between the chute 6 and the rotatable disk 11, as clearly shown in Fig. 2. This toggle-valve comprises a pair of curved blades 35, which cross each other when said valve is in its closed position, as shown in Fig. 4. The blades 35 also coöperate together, as the blades of a pair of scissors, to cut the lint from the cotton seed, which lint might prevent some of the seed from being deposited in the ground, as will be apparent hereinafter. The blades 35 are pivotally connected with the upper end of the chute 6, as shown at 36. Pairs of links 37 are pivotally connected with the rear ends of the plates 35, as shown at 38. The links 37 are pivotally connected with a reciprocatory rod 39, as shown at 40. This reciprocatory rod is suitably supported by a casting 41. A scraper 69 is detachably connected with the casting 15, as shown at 70, such scraper serving to level off the contents of each successive opening 14. A transverse rock-shaft 42 is provided, the same being preferably square in cross-section for the greater portion of its length, and having a central portion formed cylindrical, as shown at 43, said cylindrical portion being journaled through a casting 44 formed on the chute 6. Suitably mounted upon and to oscillate with the rock-shaft 42, is a crank 45, to the upper end of which is pivotally connected a link 46, as shown at 47. This link has its rear end pivotally connected with a sleeve 48, which is rigidly connected with the reciprocatory rod 39. The rock-shaft 42 carries a lever or crank 49, which is adapted to oscillate with said shaft. The lever 49 has pivotal connection intermediate its ends, with a link 50, as shown at 51. The lever 49 is provided with a plurality of openings 52, whereby the link 50 may be pivotally connected to such lever at these points. The link 50 extends downwardly for pivotal connection with a reciprocatory valve 53, as shown at 54. This valve comprises a guide bracket 55, engaging a stationary pin 56', having suitable connection with the material of the chute 6. The lever 49, as shown in Fig. 2, is in its uppermost position, and when released may be returned to its lowermost position by a retractile coil spring 57, which has suitable connection with the lever 49 and the chute 6. The rock-shaft 42 carries a third lever or crank 58, which has pivotal connection with a link 59, as shown at 60. This link extends forwardly for pivotal connection with a lever or crank 61, as shown at 61'. The crank 61 is mounted upon a second rock-shaft 62, which preferably may be square in cross-section for the greater portion of its length. The rock-shaft 62 has a portion thereof (not shown), formed cylindrical, which cylindrical portion is suitably journaled through a casting 63, having connection with the transverse bar 4. Near the lever or crank 61 is disposed a lever or crank 64, which is suitably mounted upon the rock-shaft 62. The crank 64 has pivotal connection with a pawl 65, as shown at 66, such pawl extending rearwardly and having a depending tooth 67 to successively engage each of the teeth 13. A portion 68 of the plate 9 is disposed below this pawl, and engages the tooth 67 to prevent accidental displacement of said pawl.

The rock-shaft 42 has suitable connection with check-row mechanism (not shown) of any well known or preferred type. This check-row mechanism is to be of such a character that the rock-shaft 42 is oscillated by the same, in the direction of the arrow. It is well known that such check-row mechanism includes a line or wire having buttons attached thereto at spaced intervals, which engage an operating lever included in the check-row mechanism. As the invention does not relate to any specific form of check-row mechanism, such mechanism has not been shown.

The parts of the apparatus are shown in the positions which the same occupy after the rock-shaft 42 has been moved by the check-row mechanism and before their release by such mechanism. As clearly shown in Fig. 2, the reciprocatory valve 53 is open, whereby the seed is deposited in the furrow, and the toggle-valve 34 is closed. As soon as the check-row mechanism releases the rock-shaft 42, the retractile coil spring 57 returns the lever 49 to its lowermost position, whereby the valve 53 is returned to its closed position. At the same time, the reciprocatory rod 39 is moved rearwardly carrying with it the links 37, whereby the plates 35 of the toggle-valve are moved to their open positions, as shown in broken lines in Fig. 4. The plunger 20 is held in its raised position, during the rearward movement of the rod 39 until the bolt 40 engages the trigger 31, whereby the bell crank lever 22 is released, and the plunger 20 urged into the opening 14, by spring 23. This plunger then forces all of the seed out of the opening 14, which seed is held within the chute 6 by the then closed reciprocatory valve 53. The toggle valve then quickly closes and the blades 35 cut all lint which holds the seed to the plunger 20, whereby the seed is free to drop into the chute. Just after the closing of the toggle valve, the plunger 20 is returned to its uppermost position. When the rock-shaft 42 is oscillated rearwardly or in a reverse direction, as indicated by the arrow, such oscillation is imparted to the rock-shaft 62, whereby the pawl 65 will impart a step by step movement to the disk 11, and bring one of the openings 14 previously filled with grain, into registration with the opening 19. It is obvious that the openings 14 may be readily filled with the seed contained in the hopper 23'. When each of the openings 14 is rotated below the scraper 69, the contents of such opening will be leveled off, and hence the exact required amount of grain is obtained to be planted. When the rock-shaft 42 is again oscillated in the direction of the arrow by the check-row mechanism, the above described operation is reversed and the parts returned to their normal positions, as shown.

I wish it understood that the form of my invention herewith shown and described, is to be taken as a preferred example of the same, and that certain changes in the shape, size and arrangement of parts may be resorted to without departing from the spirit of my invention or the scope of the subjoined claims.

Having thus described my invention, I claim:—

1. In apparatus of the character described, a chute, a valve disposed near the upper end thereof for controlling the passage of material through the same, a plunger to force material into said chute, means to move the plunger, and means to hold the plunger against movement, the last named means being actuated by the valve.

2. In apparatus of the character described, a chute, a journaled disk provided with openings for supplying material to said chute, a plunger to force the material from the openings, a valve to consecutively close one end of each of the openings, means to move said valve to its open position, and means to hold the plunger against movement, the last named means being actuated by said valve.

3. In apparatus of the character described, a chute, a rotatable disk provided with openings for supplying material to said chute, valves arranged near the upper and lower ends of the chute for controlling the passage of material therethrough, common means for actuating said valves and rotatable disk, and a plunger to coöperate with said disk.

4. In apparatus of the character described, a chute, a rotatable disk provided with openings for receiving the grain and discharging the same from the receptacle, a plunger to force the grain from the openings, a valve arranged near the upper end of said chute, comprising a plurality of members connected to form a toggle joint, means to move said plunger, means to hold the plunger against movement, said last named means being disposed in the path of travel of said valve, and means to move said valve.

5. In apparatus of the character described, a receptacle for holding grain, a rotatable disk provided with openings for receiving said grain and discharging the same from said receptacle, a plunger to force the grain from the openings, and coöperating pivoted blades disposed below said plunger, said grain passing between said blades and said blades serving to cut fiber holding the grain to the plunger.

6. In apparatus of the character described, a receptacle for holding grain, a rotatable disk provided with openings and arranged for discharging the grain from said receptacle, a plunger to force the grain from the openings, a spring to move the plunger, a bell-crank lever connected with said plunger, coöperating pivoted blades disposed near said plunger to cut fiber holding the grain to said plunger, and common means to move said blades and bell-crank lever.

7. In apparatus of the character described, a receptacle for holding grain, a journaled disk provided with openings and arranged for discharging the grain from said receptacle, a plunger to force the grain from the openings, means to move said plunger, a lever connected with said plunger, means disposed near the rotatable disk for cutting fiber tending to hold the grain to the plunger, and common means to move the cutting means and said lever.

8. In apparatus of the character described, a receptacle for holding grain, a journaled disk provided with openings and arranged to discharge grain from said receptacle, a plunger to force grain from the openings, and means disposed near and below said disk to cut fiber tending to hold said grain to the plunger.

9. In apparatus of the character described, a receptacle for holding grain, a rotatable disk provided with openings and arranged to discharge the grain from said receptacle, a plunger to force grain from the openings, means disposed near said disk to cut fiber holding the grain to the plunger, means to operate the first named means, and means to rotate said disk.

10. In apparatus of the character described, a receptacle for holding grain, a rotatable disk provided with openings and arranged to discharge grain from said receptacle, a plunger to force grain from the openings, a spring to move the plunger, means disposed near said disk to cut fiber holding the grain to the plunger, and common means to move the disk and the first named means.

11. In apparatus of the character described, a receptacle for holding grain, a rotatable disk provided with openings and disposed to discharge grain from said receptacle, a plunger to force the grain from said openings, a chute into which the grain is discharged, coöperating blades disposed near said disk and adapted to cut the fiber holding the grain to said plunger, a valve for controlling the discharge of the grain from the chute, and common means to move said blades and valve.

12. In apparatus of the character described, a receptacle for holding grain, a journaled disk provided with openings and arranged to discharge the grain from said receptacle, a plunger to force the grain from the openings, a lever connected with said plunger, means to hold said lever against movement, coöperating blades disposed near said disk to cut the fiber holding the grain to said plunger, and means to move said blades, the last named means being adapted to actuate the first named means when moved in one direction and to engage said lever when moved in a reverse direction for returning the plunger to its starting position.

13. In apparatus of the character described, a receptacle for holding grain, a disk provided with an opening disposed near one end of the receptacle, a plunger to force the grain through the opening, pivoted blades disposed near said disk to cut the fiber holding the grain to the plunger, links connected with said blades and forming therewith a toggle joint, a reciprocatory rod connected with said toggle joint, and means to move said rod.

14. In apparatus of the character described, a receptacle for holding grain, a disk provided with an opening and disposed near one end of the receptacle, a plunger to force the grain from the opening, means to move said plunger, pivoted blades disposed near said disk to cut the fiber holding the grain to the plunger, links connected with said blades and forming therewith a toggle joint, a rock-shaft, connecting means between the same and said links, a chute for receiving the grain discharged from the receptacle, a valve to control the passage of grain from said chute, connecting means between said valve and rock-shaft, and means connected with said plunger and adapted to be moved by the first named connecting means.

In testimony whereof I affix my signature in presence of two witnesses.

PETER A. CUSTER.

Witnesses:
C. M. SMITH,
M. W. TAYLOR.

---

Copies of this patent may be obtained for five cents each, by addressing the "Commissioner of Patents, Washington, D. C."